United States Patent [19]

Shimamoto et al.

[11] Patent Number: 5,003,525
[45] Date of Patent: Mar. 26, 1991

[54] APPARATUS FOR READING A MAGNETO-OPTICAL DISK

[75] Inventors: Masayoshi Shimamoto; Kazuhiko Nakane; Teruo Furukawa, all of Hyogo, Japan

[73] Assignee: Mitsubishi Denki Kabushiki Kaisha, Tokyo, Japan

[21] Appl. No.: 209,552

[22] Filed: Jun. 21, 1988

[30] Foreign Application Priority Data

Jun. 26, 1987 [JP] Japan .................. 62-160349

[51] Int. Cl.⁵ .............................. G11B 7/00
[52] U.S. Cl. ...................... 369/44.41; 369/124
[58] Field of Search ................ 369/13, 44–46, 369/110, 44.41, 44.42, 44.29, 44.31, 44.34, 44.35, 44.36, 124

[56] References Cited

U.S. PATENT DOCUMENTS

| | | | |
|---|---|---|---|
| 4,059,841 | 11/1977 | Bricot et al. | 369/46 X |
| 4,065,786 | 12/1977 | Stewart | 369/46 |
| 4,143,402 | 3/1979 | Bricot et al. | 369/46 X |
| 4,293,944 | 10/1981 | Izumita et al. | 369/46 X |
| 4,451,863 | 5/1984 | Yanagida et al. | 360/114 |
| 4,475,182 | 10/1984 | Hosaka | 369/46 X |
| 4,589,102 | 5/1986 | Volleau et al. | 369/46 |
| 4,660,191 | 4/1987 | Maeda et al. | 369/46 |
| 4,663,751 | 5/1987 | Kaku et al. | 369/46 |
| 4,730,295 | 3/1988 | Bressers et al. | 369/46 |
| 4,740,940 | 4/1988 | Tanaka et al. | 369/46 X |
| 4,744,069 | 5/1988 | Sugiyama et al. | 369/46 X |
| 4,783,590 | 11/1988 | Aoi | 369/46 X |

FOREIGN PATENT DOCUMENTS

195606 9/1986 European Pat. Off. .......... 365/110

*Primary Examiner*—Donald McElheny, Jr.
*Attorney, Agent, or Firm*—Wolf, Greenfield & Sacks

[57] ABSTRACT

A recording medium drive apparatus has a first detector for detecting tracking information and a second detector for detecting focusing information when magnetization information and pit information recorded on an optical disc are reproduced and detected. This apparatus also comprises a preamplifier having the function of selecting by a control signal either a mode for adding and amplifying output signals of the first and second detectors by utilizing a predetermined gain or a mode for subtracting and amplifying those output signals by utilizing another predetermined gain, of unconditionally selecting the polarities of the added and subtracted amplification signals by means of the control signal, and of selectively outputting signals $V_i$ ($i=1, 2, 3, 4$).

16 Claims, 8 Drawing Sheets

APPARATUS FOR READING A MAGNETO-OPTICAL DISK

BACKGROUND OF THE INVENTION

1. Field of the Invention

The present invention relates to a magneto-optic disc drive apparatus and, more particularly, to a recording medium drive apparatus having a function whereby in the case of reproducing a magneto-optic disc on which pit information and magnetization information are recorded in a mixed fashion, the reproduced information can be accurately processed irrespective of the polarities of the pit information and magnetization information.

2. Description of the Prior Art

In recent years, the amount of information being processed by computers is steadily increasing. Much attention has been focused on magneto-optic disc apparatus which can record, reproduce and erase large amounts of information. The improvements which have been achieved in this technique are remarkable.

With magneto-optic disc apparatus, there is no need for the user to change the address information of tracks and/or sectors on the recording medium, sector marks allowing the user to recognize the heads of the sectors, and the like. They are therefore previously recorded as concave or convex pit information when the discs are manufactured. On the other hand, data such as user's data in the area which needs to be rewritten is processed as magnetization information.

The amplitudes and polarities of the pit information reproduction signals and magnetization information reproduction signals will now be simply explained. The amplitude of a pit information reproduction signal depends on the light power on the medium surface, light reflectance of the medium, modulation degree according to the depths of convex or concave pits, and/or light transmittance of the reproduction optical system. The amplitude of the magnetic information reproduction signal depends on the light power on the medium surface, light reflectance of the medium, Kerr rotational angle, and/or light transmittance of the reproduction optical system. In addition, the polarity of the magnetization information reproduction signal depends on the magnetizing direction of the magnetized domain.

An example of a conventional apparatus for reproducing a disk on which such different kinds of mixed signals are recorded is disclosed in Japanese Patent Application No. 61-267953.

Figure 1:
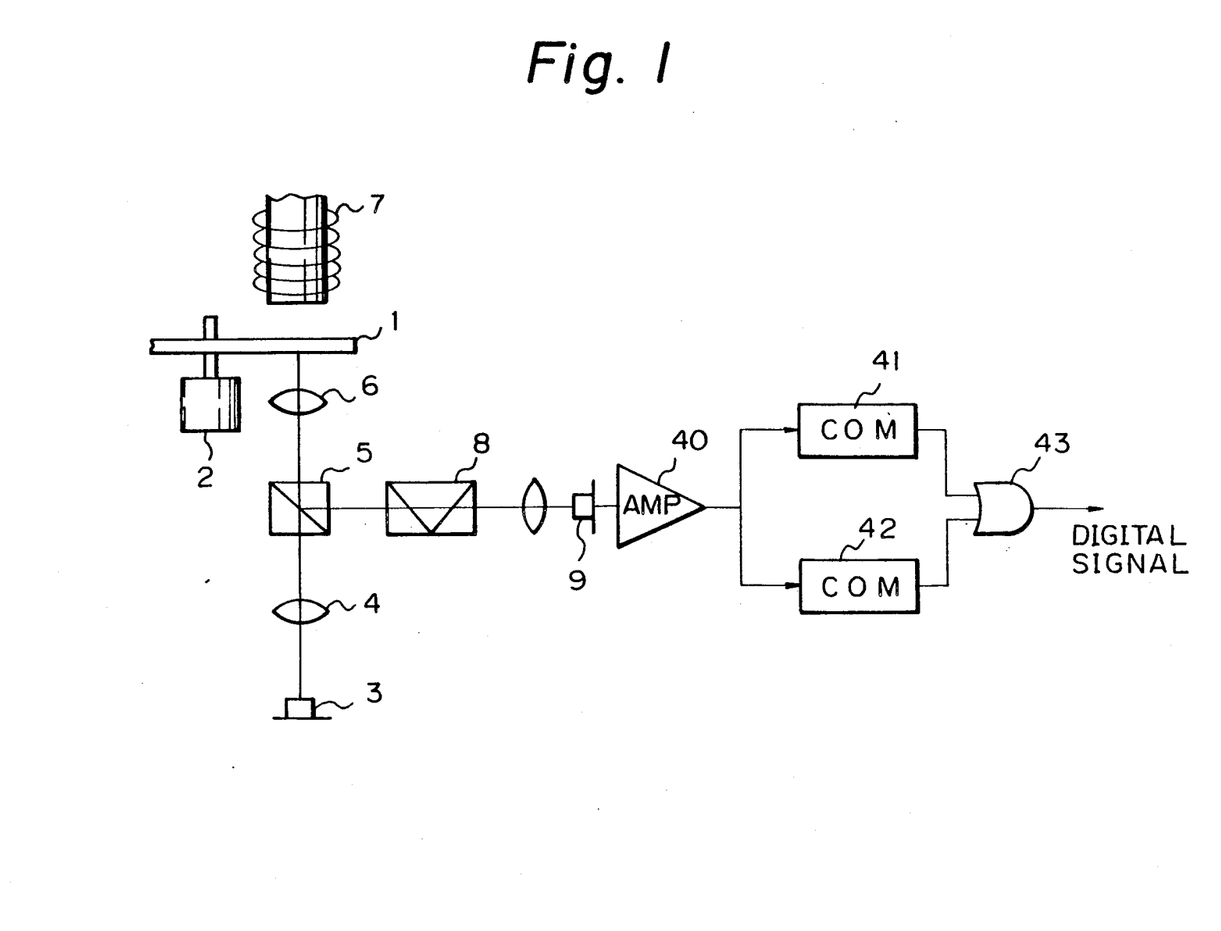
FIG. 1 is an arrangement diagram showing a conventional magneto-optic disc apparatus.

FIG. 1 is a diagram showing the arrangement of a conventional magneto-optic disc apparatus. In the diagram, a magneto-optic disc 1 is rotated by a rotating motor 2. A perpendicular magnetization film having a magneto optical effect is formed on the disc 1. The recording, erasure and reproduction of the magnetization information are performed in the following manner.

The light emitted from a semiconductor laser 3 is converted into the parallel light fluxes by a coupling lens 4 and transmitted to a condenser lens 6 through a polarizing prism 5. Then, the light fluxes are focused as a micro spot onto the perpendicular magnetization film on the disc 1. The light reflected from the disc 1, whose polarizing plane is rotated, passed through the condenser lens 6 and polarizing prism 5 and is led to an analyzer 8. The analyzer 8 is an optical device adapted to allow only a special polarizing component to pass through it. Therefore, the analyzer 8 can convert the rotation of the polarizing plane into a change in amount of light. This light amount is converted into an electric signal by a photodetector 9 and, thereafter, it is amplified to a desired level by an amplifier 40. The principle of the information reproduction that is effected with such a detection optical system will be described by reference to FIG. 2, mainly with respect to the detection of the rotation of the polarizing plane of the analyzer.

Figure 2:
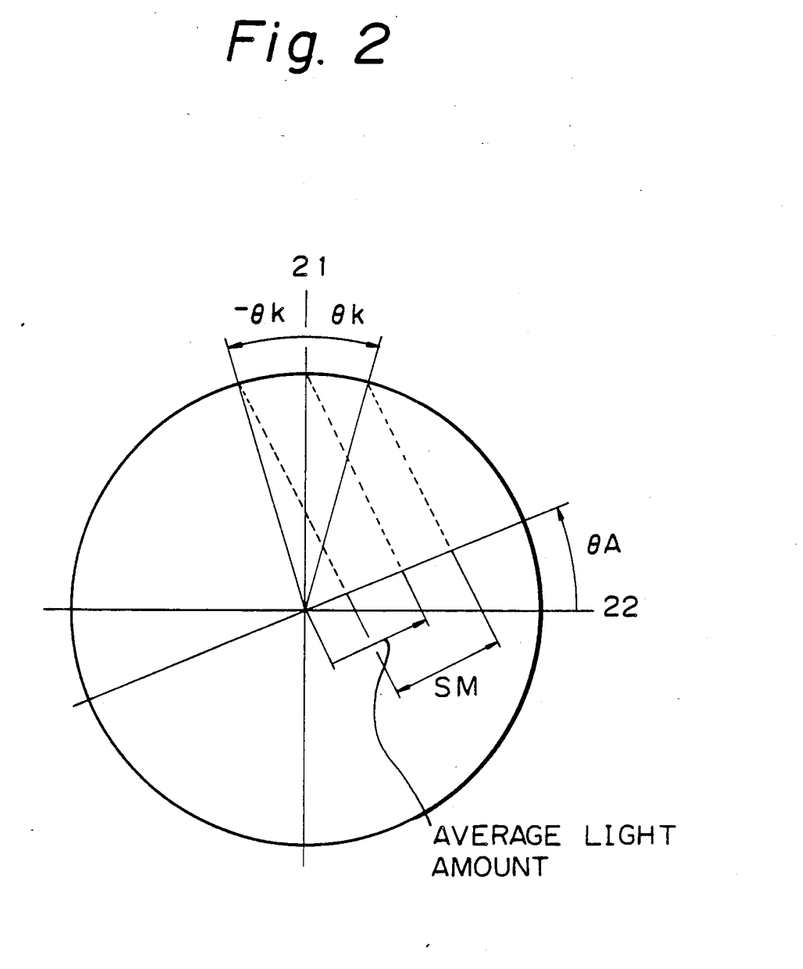
FIG. 2 is an explanatory diagram showing the principle of the information reproduction of an optical disc.

In FIG. 2, an axis 21 is a polarizing axis of a laser beam which is irradiated onto the disc 1. Assuming that the polarizing plane of the light reflected by the disc 1 was only rotated by, e.g., a Kerr rotational angle of $\theta_k$ in the portion having the magnetized domains, the polarizing plane in the non-recorded portion is rotated by a Kerr rotational angle of $-\theta_k$. An axis 22 which is rotated by an angel of 90° from the axis 21 is called a quenching axis. When the polarizing plane passing axis of the analyzer 8 is made coincident with the quenching axis 22, the amount of light which passes through the analyzer 8 in the polarizing state of the axis 21 reaches its minimum value.

When the polarizing plane passing axis of the analyzer 8 is only rotated by an angle of $\theta_A$ from the quenching axis 22 and set, the amount of light which passes through the analyzer is equal to the amount of light projected on the $\theta_A$ axis. Namely, the change in light amount corresponding to the presence or absence of the magnetized domain is derived as a magnetization information reproduction signal.

When the rotational angle of the analyzer is set such that the S/N (signal to noise) ratio of the magnetization information reproduction signal reaches its maximum value, the amplitudes of tho pit information reproduction signal generally differ from those of the magnetization information reproduction signal by several fold.

Therefore, if the magnetization information reproduction signal and pit information reproduction signal are binarized by using different threshold values, only the pit information reproduction signal can be read out. Further, if the OR of the logic data derived by binarizing those signals by use of the different threshold values is calculated, they can also be reproduced as a series of data trains.

Figure 3:
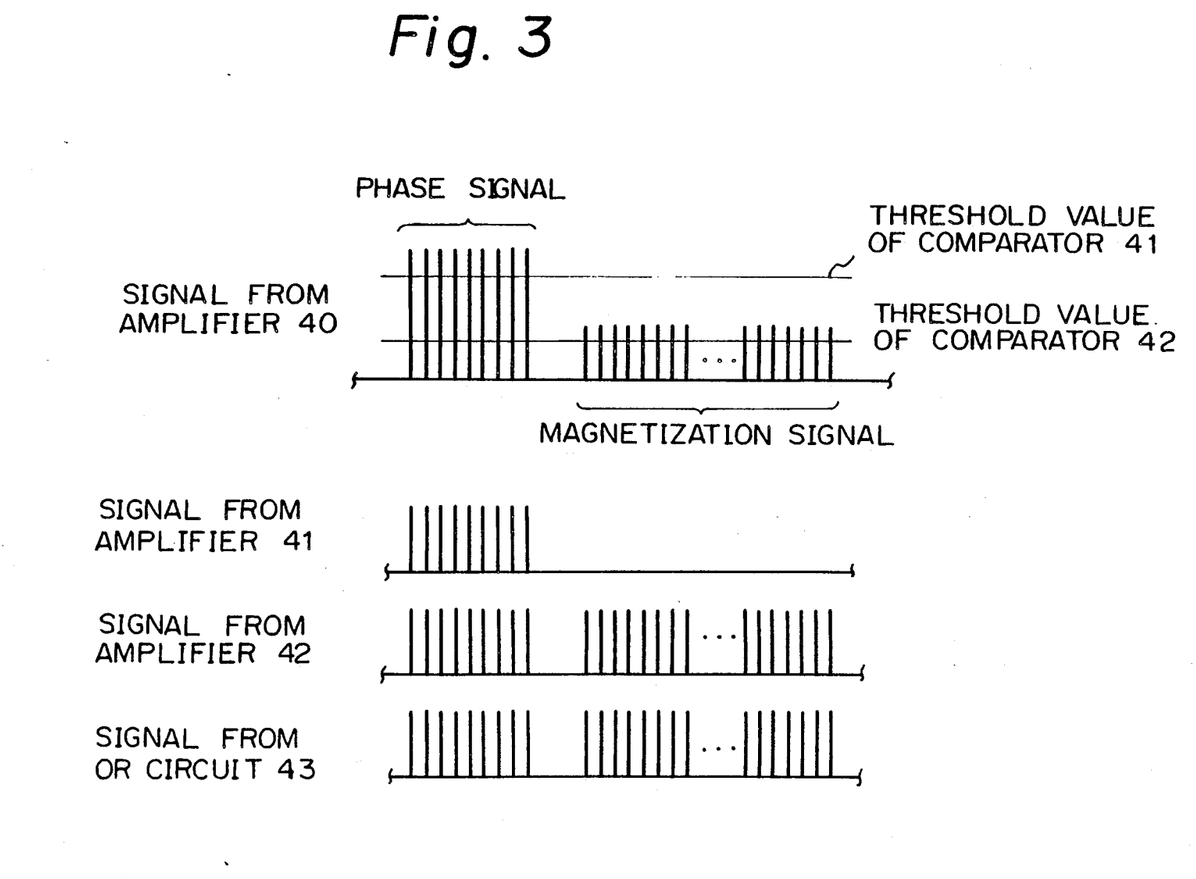
FIGS. 3 and 4 are signal waveform diagrams employed to explain the operation of the apparatus in FIG. 1.

FIG. 3 is a time chart showing binarizing and synthesizing methods. The threshold values for binarization in comparators 41 and 42 are set as shown in the diagram for the signal from the amplifier 40. Thus, only the pit information reproduction signal is output as the binarization signal from the comparator 41. In the binarization signal from the comparator 42, the pit information reproduction signal and magnetization information reproduction signal exist in a mixed state. To output a series of data trains, the OR of the outputs of the comparators 41 and 42 is calculated.

Figure 4:
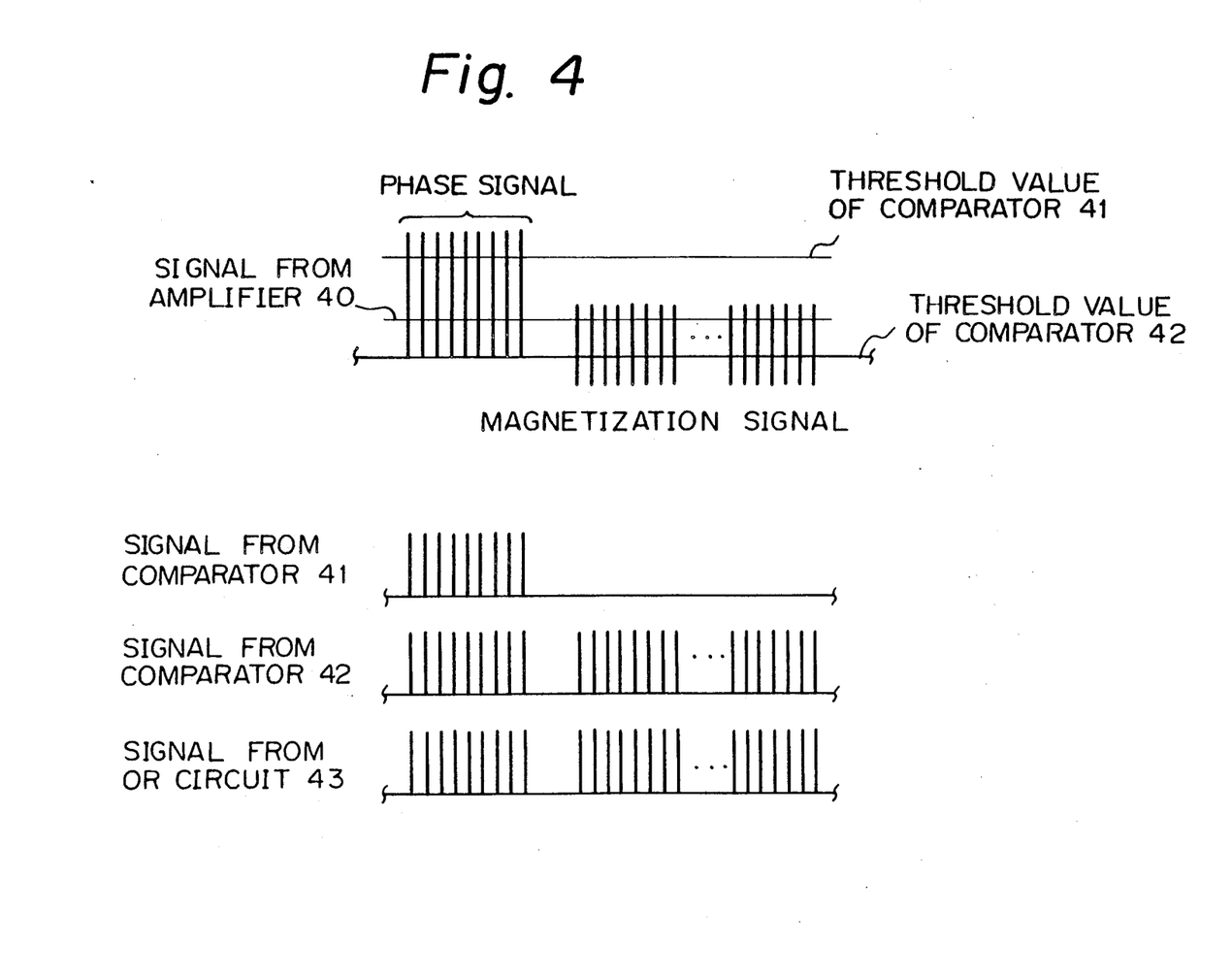

On the other hand, by setting the rotating direction of the analyzer to the direction opposite to that in FIG. 3, a signal as shown in FIG. 4 is obtained as the output of the amplifier 40. Therefore, by respectively setting the threshold values of the comparators 41 and 42 as shown in FIG. 4, each binarization signal corresponds solely to the pit information reproduction signal or the magnetization information reproduction signal. If those signals are processed as a series of data trains, the OR of the outputs of the comparators 41 and 42 is calculated by an OR circuit 43 in a manner similar to the case of FIG. 3.

According to the above constitution, when reproducing the information from a magneto-optic recording medium on which the pit information reproduction signal and magnetization information reproduction signal are recorded in a mixed manner, the polarizing plane passing axis angle of the analyzer is set so as to obtain the maximum S/N ratio of the magnetization signal. For the signal obtained by the photodetector arranged after the analyzer, different threshold values are respectively set for the pit information reproduction signal and magnetization information reproduction signal, and binarization is performed by using these threshold values. This offers such advantages that the detection optical system can be miniaturized and simplified and the information can be reproduced without any data dropout.

The conventional recording medium drive apparatus is constituted in the manner explained above.

In general, the recording medium drive apparatus permits fluctuation components of various kinds of parameters such as reflectance of the recording medium, laser power, Kerr rotational angle, light transmittance of the reproduction optical system, and the like. It is necessary to accurately reproduce the information. Among the various kinds of parameters, those whose fluctuation ranges are already known will now be mentioned. The product ($R \times \theta_x$) of a reflectance R of the recording medium and the Kerr rotational angle $\theta_k$ fluctuates within a range of from 0.1 to 0.25. The laser power fluctuates within a range of from 0.4 to 15 mW in consideration of the recording, reproduction and erasure. Thus, it can be predicted that the output of a photodetector fluctuates to a remarkable extent.

On the other hand, a recording medium drive apparatus must also cope with changes in polarities of pit information reproduction signals and magnetization information reproduction signals.

However, in the conventional apparatus, since the gain of the amplifier 40 and the threshold values of the comparators 41 and 42 are fixed, it is difficult to accurately reproduce the information for any large fluctuation in input signal which is caused by fluctuations in the parameters mentioned above. Further, the polarity of the pit information reproduction signal cannot be switched over. Therefore, there are limitations in terms of the recording medium and laser power which can be used and the versatility of a conventional apparatus is therefore lacking.

SUMMARY OF THE INVENTION

The present invention has been accomplished in view of the foregoing conventional problems and it is an object of the invention to provide a recording medium drive apparatus having as one component element of the recording medium drive apparatus a preamplifier having functions which enable accurate reproduction of information by absorbing the fluctuation components of the various kinds of parameters mentioned above and which can also switch the polarities of pit information reproduction signals and magnetization information reproduction signals.

To accomplish the above object, a recording medium drive apparatus is provided with a preamplifier comprising: a first detector to detect tracking information and a second detector to detect focusing information when magnetization information and pit information recorded on an optical disk are reproduced and detected; first switching means for selecting either a mode for adding and amplifying output signals (these signals are hereinafter referred to as $S_1$ and $S_2$) of the first and second detectors by utilizing a constant gain ($=K_1$) or a mode for subtracting and amplifying these output signals by utilizing another constant gain ($=K_2$) on the basis of a control signal; and second switching means for unconditionally selecting the polarities of the added and subtracted amplification signals on the basis of the control signal, wherein the preamplifier has the function of obtaining signals $V_i$ ($i=1, 2, 3, 4$) which are determined by the switching means, in which:

$$V_1 = K_1 \times (S_1 + S_2)$$

$$V_2 = -K_1 \times (S_1 + S_2)$$

$$V_3 = K_2 \times (S_1 - S_2)$$

$$V_4 = -K_2 \times (S_1 - S_2).$$

According to the present invention, in the case of recording, reproducing and erasing information by use of various kinds of optical disk media, the amounts of change in respect of the pit information detection signal and magnetization information detection signal which arise because the outputs of the photodetector change within a wide range are absorbed by changing the gain of the variable gain type differential amplifier, and the output of this amplifier is adjusted to such a signal level that the information can be accurately detected Further, the connection of the detection signal to the input terminal of the variable gain type differential amplifier is changed by a switch, thereby making it possible to also cope with any change in polarity of the reproduction signal.

The above and other features and advantages of the invention will be apparent from the following detailed description taken in conjunction with the accompanying drawings.

DESCRIPTION OF THE PREFERRED EMBODIMENT

Figure 5:
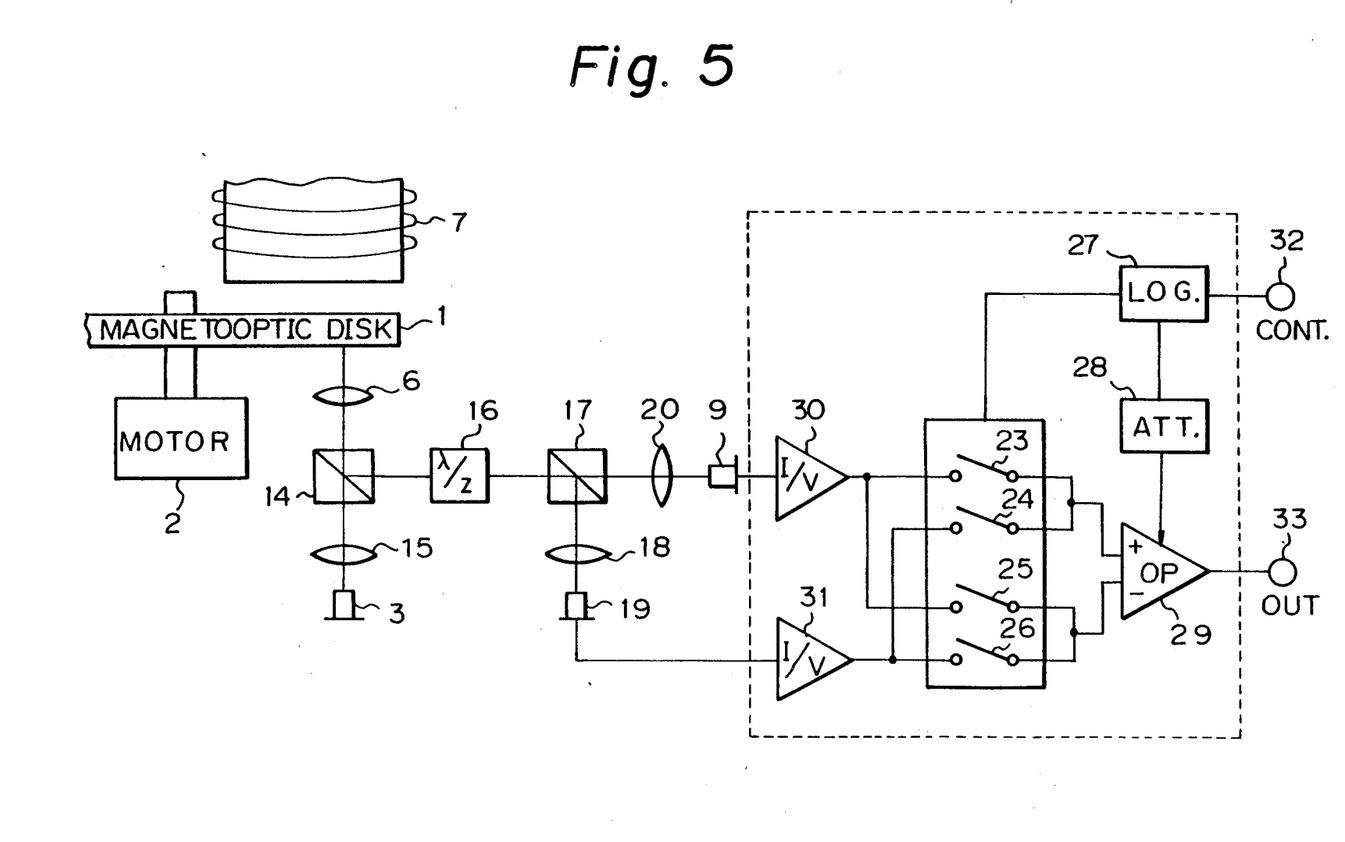
FIG. 5 is a block diagram showing an embodiment of a preamplifier of a recording medium drive apparatus according to the present invention.

FIG. 5 shows photodetectors and a preamplifier (P) as an embodiment of a recording medium drive apparatus according to the present invention. In the diagram, the magneto-optic disc 1 is rotated by the rotating motor 2. A perpendicular magnetization film having a magnetic optical effect is formed on the disc 1. The recording, erasure and reproduction of the magnetization information are executed in the following manner.

The light emitted from a semiconductor laser is converted into parallel light fluxes by a collimator lens 15 and transmitted to the condenser lens 6 through the beam splitter 14. These light fluxes are focused as a micro spot onto the perpendicular magnetization film n the disc 1. In the case of recording information, the drive current of the semiconductor laser 3 is modulated by an information signal, the temperature of the perpendicular magnetization film on the disc 1 is raised to the Curie temperature or higher by the heat of the photo pulses corresponding to the information, and demagnetization is thereby performed. If the magnetic field in the direction opposite to the magnetizing direction of the non-recorded portion is applied from the outside by an electromagnetic coil 7, only the light irradiated portion becomes the recording domain having magnetization in the opposite direction. To erase the recorded information, it is sufficient to apply the magnetic field in the direction opposite to that utilized at the time of recording, simultaneously with light irradiation. The magnetization information is reproduced by using the magnetic optical effect. The magnetic optical effect is the effect whereby the polarizing plane of the incident light rotates in accordance with the magnetizing direction of the perpendicular magnetization film. The Kerr effect is an example of such an effect. The light reflected from the disc 1, the polarizing plane of which is rotated, passes through the condenser lens 6, a beam splitter 14, and a λ/2 wavelength plate 16 and is transmitted to a polarizing beam splitter (hereinafter, abbreviated as PBS) 17. The PBS 17 is an optical device for dividing the reflected light from the disc 1 into the component moving in the same polarizing axial direction as the incident light and the component moving in the polarizing axial direction rotated by 90° for the polarizing axis of the incident light. Therefore, the rotation of the polarizing plane can be converted into an amount representing the change in light. The reflected light from the disc which has been divided into these two kinds of components by the PBS is converted into electrical signals by first and second detectors 9 and 19 through condenser lenses 18 and 20. One of the electrical signals converted by the two photodetectors is used as the tracking information and the other is used as the focusing information.

The principle of the information reproduction executed by the detection optical system described above will now be explained with reference to FIG. 6.

Figure 6:
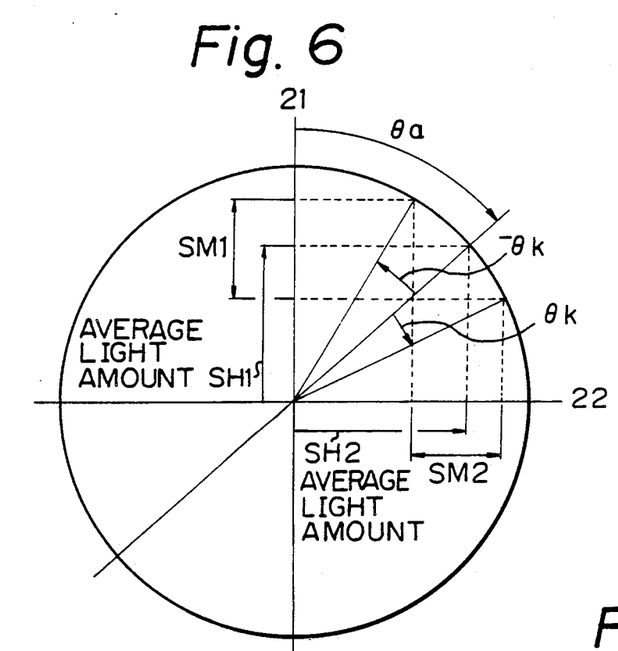
FIG. 6 is a diagram employed to explain the principle of the magnetic optical reproduction which is used in the recording medium drive apparatus.

In FIG. 6, the axis 21 is the polarizing axis of the laser beam which is irradiated onto the disc 1. The axis 22 is that which has been rotated by 90° from the axis 21. Assuming that the polarizing plane of the light reflected from the disc 1 was only rotated by, e.g., the Kerr rotational angle $\theta_k$ in the portion having the magnetic domains, the polarizing plane in the non-recorded portion is only rotated by the Kerr rotational angle $-\theta_k$ in the opposite direction.

Thus, when the polarizing plane of the light reflected from the disc 1 which is led to the PBS 17 is rotated merely by $\theta_a$ from the axis 21 by the λ/2 plate 16 and set, the polarizing plane of the reflected light from the disc changes by $(\theta_a \pm \theta_k)$ from the axis 21 in the recorded and nonrecorded portions. Now, assuming that magnetization information reproduction signals which are respectively detected by the first and second detectors are $S_{M1}$ and $S_{M2}$, $$S_{M1} = P_o \cdot \cos^2(\theta_a + \theta_k) - P_o \cdot \cos^2(\theta_a - \theta_k) \quad (1)$$
$$= -P_o \cdot \sin 2\theta_a \cdot \sin 2\theta_k$$

$$S_{M2} = P_o \cdot \sin^2(\theta_a + \theta_k) - P_o \cdot \cos^2(\theta_a - \theta_k) \quad (2)$$
$$= P_o \cdot \sin 2\theta_a \cdot \sin 2\theta_k$$

Therefore the signals $S_{M1}$ and $S_{M2}$ have the same amplitude and the inverted polarities. The mean values of the magnetization information reproduction signals detected by the first and second detectors are, respectively, $$S_{M1} = P_o \cdot \cos^2 \theta_a \quad (3)$$

$$S_{M2} = P_o \cdot \sin^2 \theta_a \quad (4)$$

The Kerr rotational angle $\theta_k$ is determined by the characteristic of the perpendicular magnetization film. The amplitudes and polarities of the magnetization information reproduction signals $S_{M1}$ and $S_{M2}$ change due to the direction ($\theta_k$ or $-\theta_k$) of the Kerr rotational angle in the non-recording mode, an amount $P_0$ of light incident on the PBS 17 and/or the rotational angle $\theta_a$.

Figure 7:
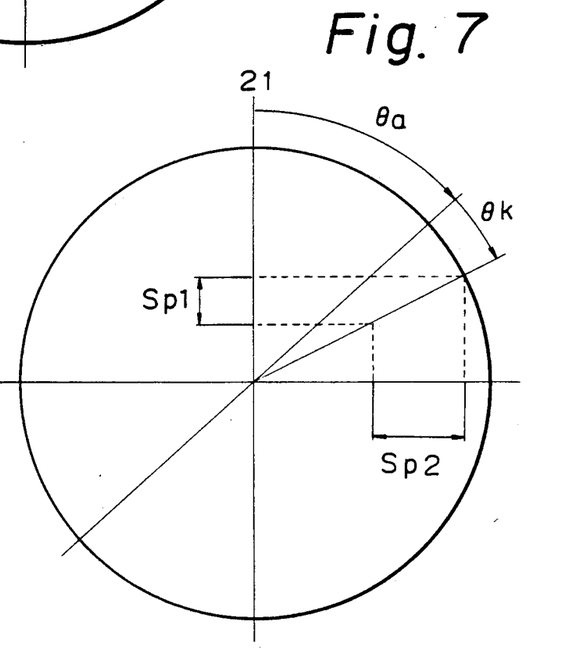
FIG. 7 is a diagram employed to explain the principle of the pit information reproduction which is used in the recording medium drive apparatus.

FIG. 7 shows a state after the signal light of the pit information recorded in the form of concave and convex pits on the disc 1 has passed through the PBS 17.

For the amount of reflected light from the concave and convex pits, the modulation degree of the signal changes in accordance with the depths of the pits. Now, assuming that the Kerr rotational angle in the non-recording mode is set at $\theta_k$, pit information reproduction signals $S_{P1}$ and $S_{P2}$ which are respectively detected by the first and second photodetectors are $$S_{P1} = \eta \cdot P_o \cdot \cos^2(\theta_a + \theta_k) \quad (5)$$

$$S_{P2} = \eta \cdot P_o \cdot \sin^2(\theta_a + \theta_k) \quad (6)$$

If the Kerr rotational angle in the non-recording mode is set at $-\theta_k$, the pit information reproduction signals $S_{P1}$ and $S_{P2}$ are set so as to replace the phase term $(\theta_a + \theta_k)$ in the equations (5) and (6) to $(\theta_a - \theta_k)$.

Figure 8:
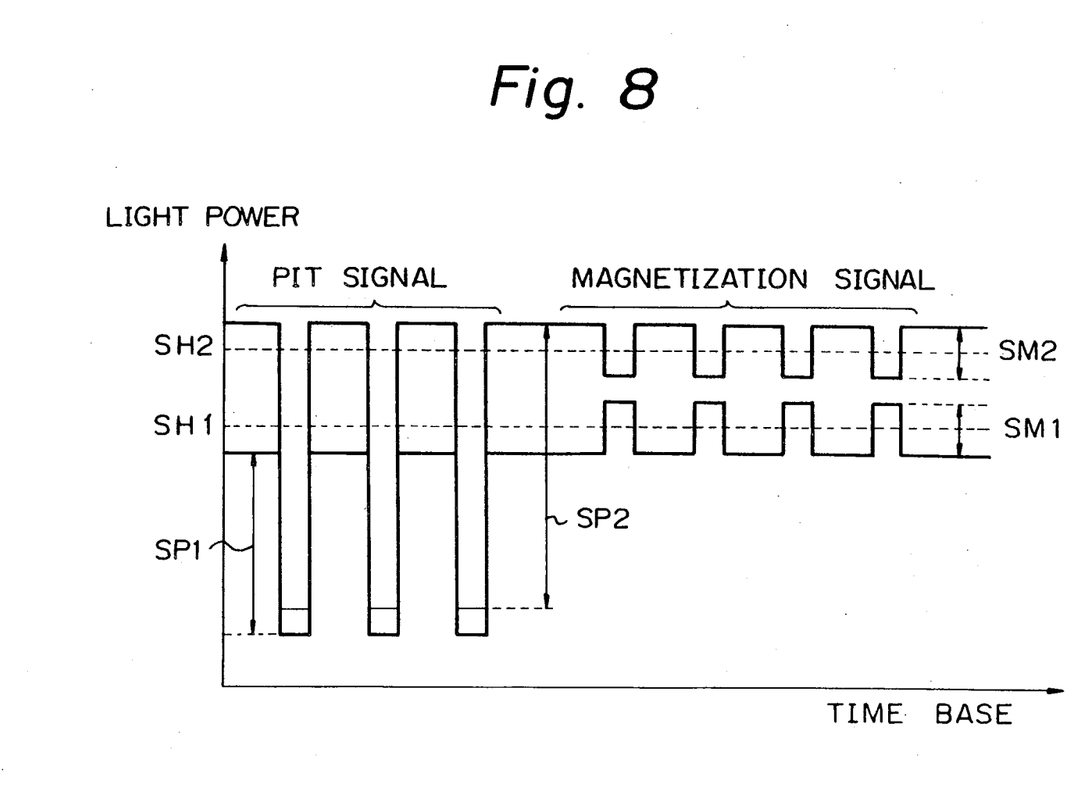
FIG. 8 is a waveform diagram showing a pit information reproduction signal and a magnetization information reproduction signal which are led to two photodetectors.

The foregoing description can be summarized as shown in FIG. 8. In FIG. 8, the Kerr rotational angle in the nonrecording mode is set to $\theta_k$.

The pit information reproduction signal and magnetization information reproduction signal are converted into electrical signals by the first and second detectors and, thereafter, they are converted into voltage signals by a first current/voltage converter 30 and a second current/voltage converter 31, respectively. The voltage signals from the first and second current/voltage converters are used as a tracking information detection signal $S_1$ and a focusing information detection signal $S_2$, respectively. The $S_1$ signal is connected to input terminals of switches (1) 23 and (3) 25. The $S_2$ signal is connected to input terminals of switches (2) 24 and (4) 26.

Outputs of the switches (1) and (2) are connected to a (+) differential input terminal of a variable gain type differential amplifier 29. Outputs of the switches (3) and (4) are connected to a (−) differential input terminal of the amplifier 29. By controlling the switches (1) to (4) and also by controlling the gain of the amplifier 29 by means of a control signal obtained from the outside and by an attenuator 28, one of the two following modes is selected, i.e., either a mode for adding and amplifying the $S_1$ and $S_2$ signals by utilizing a predetermined gain ($=K_1$) by means of the variable gain type differential amplifier in the case of reproducing pit information and a mode for subtracting an amplifying the $S_1$ and $S_2$ signals by utilizing another predetermined gain ($=K_2$) in the case of reproducing magnetization information. On the other hand, the polarities of the added and subtracted amplification signals are unconditionally switched and output to an output terminal 33. The signals $V_i$ (i=1, 2, 3, 4) which are output to the output terminal are $$V_1 = K_1 \times (S_1 + S_2) \quad (7)$$

$$V_2 = -K_1 \times (S_1 + S_2) \quad (8)$$

$$V_3 = K_2 \times (S_1 - S_2) \quad (9)$$

$$V_4 = -K_2 \times (S_1 - S) \quad (10)$$

Figure 9A:
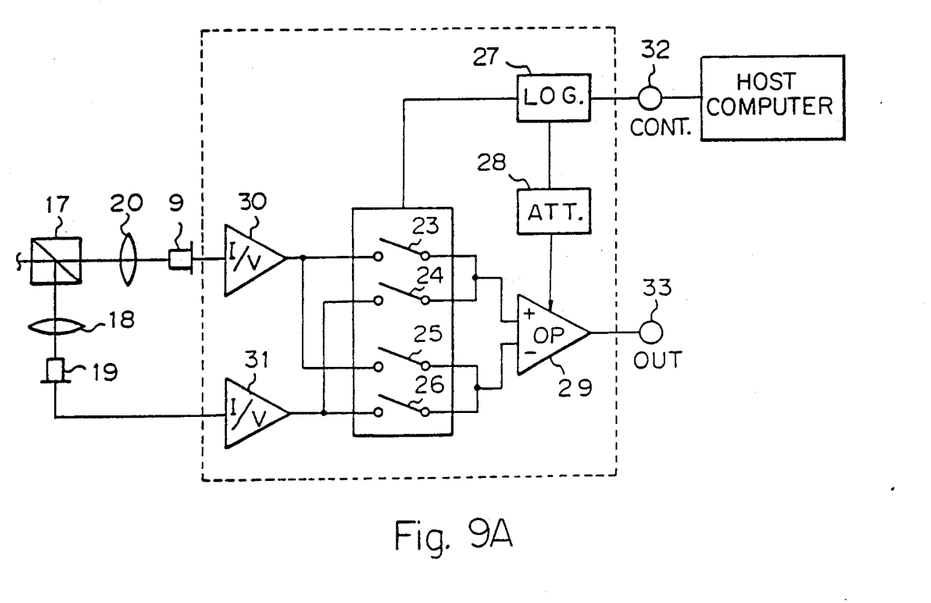
FIG. 9A is a partial block diagram of the recording medium drive apparatus of FIG. 5 with a host computer serving as a control signal source.
Figure 9B:
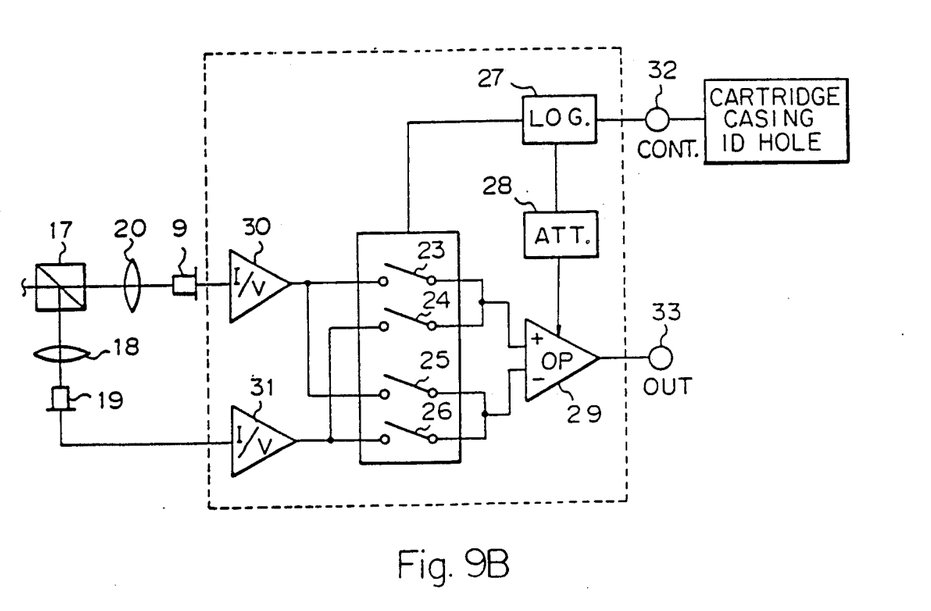
FIG. 9B is a partial block diagram of the recording medium drive apparatus of FIG. 5 with a cartridge casing ID hole serving as a control signal source.

The control signal which is used for the gain control mentioned above is derived by, for example, utilizing the method whereby a control track recorded as pit information on the recording medium is detected or the method whereby an ID hole formed in a cartridge casing to protect the recording medium is detected when the apparatus is activated. The control signal can also be obtained from a host computer, a switch, or the like. The preamplifier according to the invention can be applied not only to a magneto-optic disc on which the pit information and magnetization information are recorded in a mixed state but also to other write-once type optical discs on which only pit information is recorded.

According to the recording medium drive apparatus of the invention, the pit information reproduction signal and magnetization information reproduction signal can be amplified to a constant level with the same polarity irrespective of fluctuations of the various kinds of parameters such as laser power and the like. Many and various kinds of media can be used. Thus, there is the advantage that an apparatus having compatibility for various recording medium drive apparatuses can be developed.

Although the present invention has been described in detail with reference to a specific embodiment thereof, it will be apparent to those skilled in the art that various changes and modifications can be made therein without departing from the spirit and scope of the invention.

What is claimed is:

1. In apparatus for reproducing information recorded a plurality of tracks on a magneto-optice disk, said apparatus having reading means responsive to said recorded information and to a focussing signal for generating an optical signal, means responsive to said optical signal for generating a tracking signal, means responsive to said optical signal for generating said focussing signal, and means responsive to said tracking signal for selectively positioning said reading means over said tracks, the improvement comprising:

means for generating a control signal which indicates a manner of combining said tracking and said focusing signals; and     means responsive to said control signal for connecting said tracking signal and said focussing signal to an operational amplifier for forming the sum and difference of said tracking and said focusing signals to generate output signals representative of said recorded information.

2. In apparatus for reproducing information recorded on a magneto-optic disk, the improvement according to claim 1 wherein said control signal generating means is responsive to said recorded information for generating said control signal.

3. In apparatus for reproducing information recorded on a magneto-optic disk, the improvement according to claim 1 wherein said magneto-optic disk is enclosed in a protective casing and said control signal generating means is responsive to a hole in said casing for generating said control signal.

4. In apparatus for reproducing information recorded on a magneto-optic disk, the improvement according to claim 1 wherein said control signal generating means is responsive to a command signal received from a host computer.

5. Apparatus for reproducing information recorded on a plurality of tracks on a magneto-optic disk, said apparatus comprising:

means for scanning said disk with an optical scanning beam to generate an optical output signal;

means responsive to a focussing signal for focussing said scanning beam;

means responsive to said optical output signal for generating a tracking signal;

means responsive to said optical output signal for generating said focussing signal;

means responsive to said tracking signal for selectively positioning said scanning means over said tracks;

means responsive to said tracking signal and to said focussing signal for forming the sum and difference of said tracking signal and said focussing signal to generate output electrical signals representative of said recorded information; and     means for generating a control signal which indicates the manner of combining said tracking and said focusing signals.

6. Apparatus for reproducing information recorded on a magneto-optic disk according to claim 5 wherein said combining means comprises an operational amplifier and means responsive to said control signal for connecting said tracking signal and said focussing signal to said amplifier to form a sum and difference signal of said tracking signal and said focussing signal.

7. Apparatus for reproducing information recorded on a magneto-optic disk according to claim 6 further comprising means responsive to said control signal for setting the gain of said operational amplifier.

8. Apparatus for reproducing information recorded on a magneto-optic disk according to claim 6 wherein said connecting means comprises switching means including:

a first switch connected to a positive input terminal of said operational amplifier for selectively coupling said tracking signal thereto;

a second switch connected to said positive input terminal for selectively coupling said focussing signal thereto;

a third switch connected to a negative input terminal of said operational amplifier for selectively coupling said tracking signal thereto; and a fourth switch connected to said negative input terminal for selectively coupling said focussing signal thereto; wherein said switching means is further responsive to said control signal for connecting said focussing signal and tracking signal to said amplifier to form an inverse-sum signal and an inverse-difference signal.

9. Apparatus for reproducing information recorded on a magneto-optic disk according to claim 5 wherein said control signal generating means is responsive to said recorded information for generating said control signal.

10. Apparatus for reproducing information recorded on a magneto-optic disk according to claim 5 wherein said magneto-optic disk is enclosed in a protective casing and said control signal generating means is responsive to a hole in said casing for generating said control signal.

11. Apparatus for reproducing information recorded on a magneto-optic disk according to claim 5 wherein said control signal generating means is responsive to a command signal received from a host computer.

12. Apparatus for reproducing information recorded on a magneto-optic disk according to claim 5 wherein said sum of said tracking signal and said focussing signal generates a pit information output electrical signal.

13. Apparatus for reproducing information recorded on a magneto-optic disk according to claim 5 wherein said difference of said tracking signal and said focussing signal generates a magnetization information output electrical signal.

14. Apparatus for reproducing information recorded on a magneto-optic disk according to claim 5 further comprising means for processing said optical output signal, said processing means comprising a first condenser lens, a beam splitter, a $\lambda/2$ wavelength plate and a polarizing beam splitter.

15. Apparatus for reproducing information recorded on a magneto-optic disk according to claim 14 wherein said tracking signal generating means comprises a second condenser lens for receiving the output of said polarizing beam splitter, a first light detector and a first current-to-voltage converter for generating said tracking signal.

16. Apparatus for reproducing information recorded on a magneto-optic disk according to claim 14 wherein said focussing signal generating means comprises a third condenser lens for receiving the output of said polarizing beam splitter, a second light detector and a second current-to-voltage converter for generating said focussing signal.

* * * * *